United States Patent [19]

McMillan

[11] 4,424,068

[45] Jan. 3, 1984

[54] SEPARATOR AND METHOD FOR SEPARATION OF OIL, GAS AND WATER

[76] Inventor: John F. McMillan, 6421 Alderfer Ave., Odessa, Tex. 79762

[21] Appl. No.: 447,053

[22] Filed: Dec. 6, 1982

[51] Int. Cl.³ .......................................... B01D 19/00
[52] U.S. Cl. ........................................ 55/38; 55/45; 55/52; 55/176; 55/177; 55/202; 55/206
[58] Field of Search ............... 55/38, 45, 46, 52, 171, 55/172, 175, 176, 177, 192, 193, 199, 201, 202, 206

[56] References Cited

U.S. PATENT DOCUMENTS

| | | | |
|---|---|---|---|
| 2,995,202 | 8/1961 | Glasgow | 55/45 |
| 3,422,028 | 1/1969 | Perry | 55/176 |
| 3,893,925 | 7/1975 | Jones | 55/176 |
| 4,017,275 | 4/1977 | Hodgson | 55/177 |
| 4,376,676 | 3/1983 | Gill | 55/177 |

*Primary Examiner*—Ernest G. Therkorn
*Attorney, Agent, or Firm*—Marcus L. Bates

[57] ABSTRACT

A separator and process for separating a mixture of oil, gas, and water, such as may be received from a hydrocarbon producing well. The separator is in the form of a vessel divided into separation chambers and provided with a dynamic separator device which progressively increases the droplet size of the oil and water of the mixture by flowing the mixture in a spiral, and thereafter flowing the mixture linearly, and thereafter flowing the mixture into the first of the separation chambers where the mixture impacts against an impact member, thereby partially separating the gas from the resultant oil and water mixture. The partially separated gas migrates to the upper end of the first chamber and is further stripped and flows out of a gas outlet. The residual liquid mixture descends into a lower chamber where the liquid separates into a water phase and an oil phase. Means are provided for maintaining the liquid level of the oil phase and water phase in a specific range respective to the vessel so that the separated oil and water can flow from the vessel along two separate flow paths.

15 Claims, 8 Drawing Figures

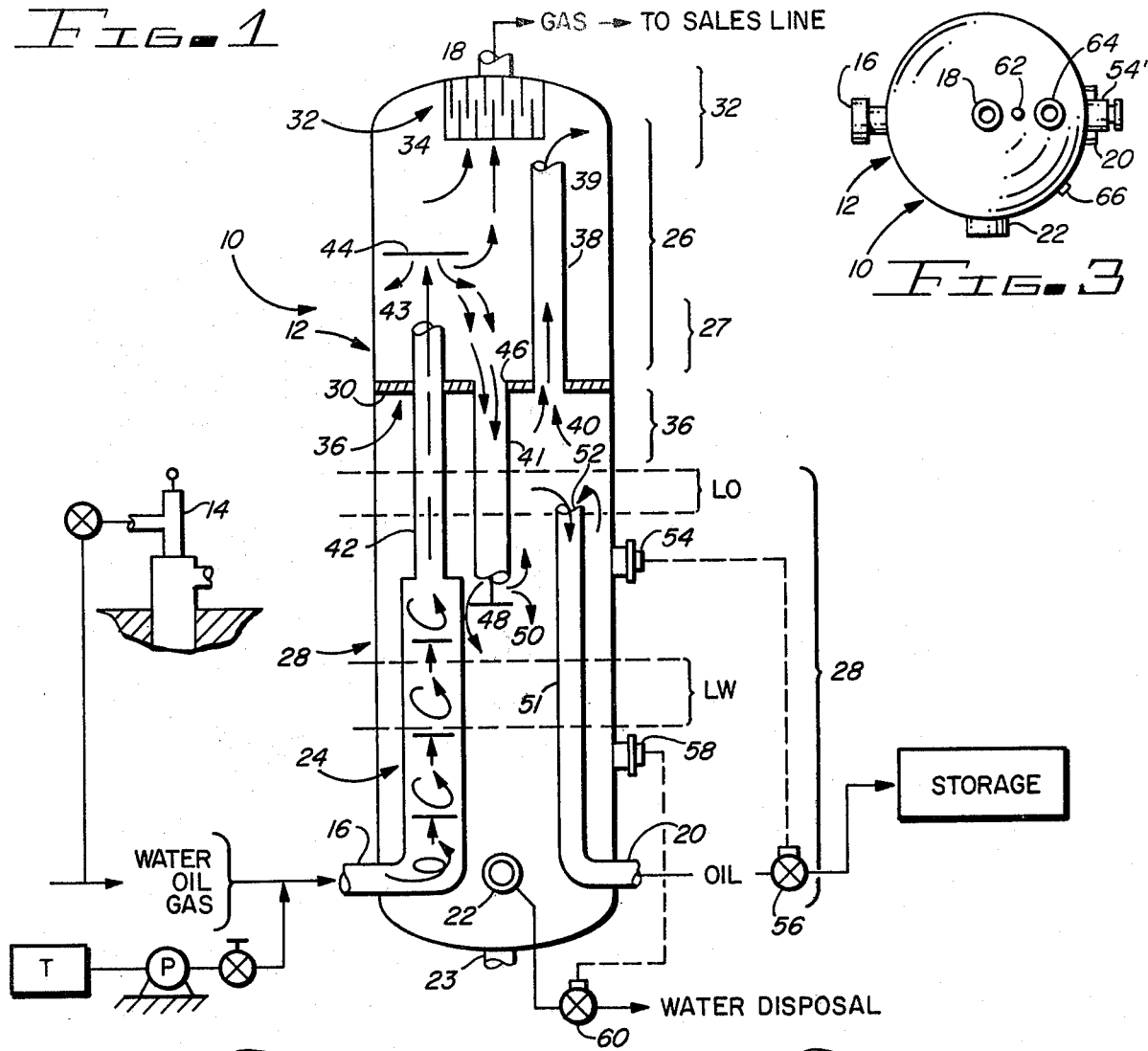
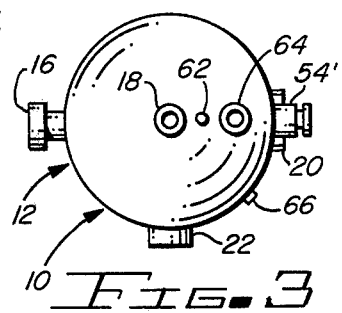
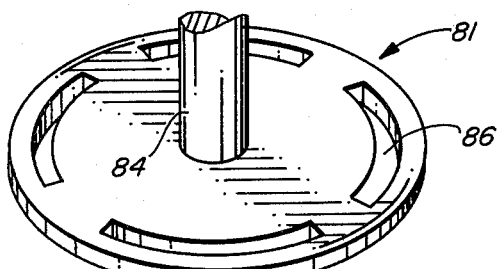
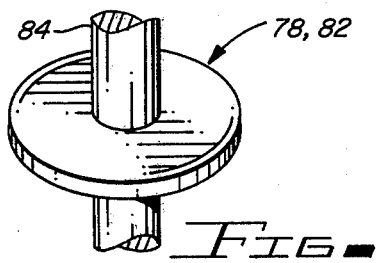
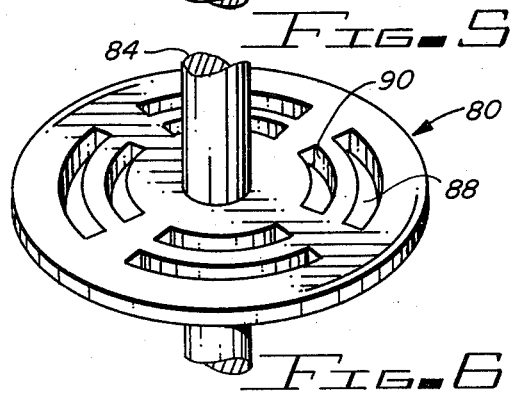
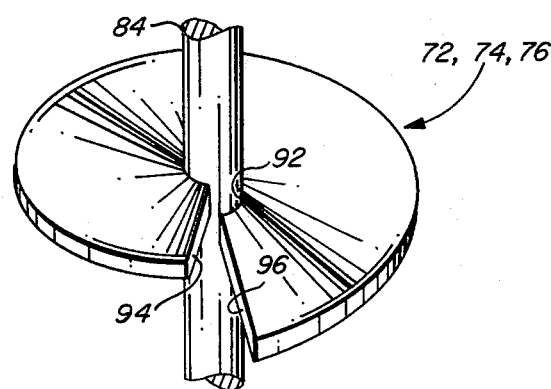

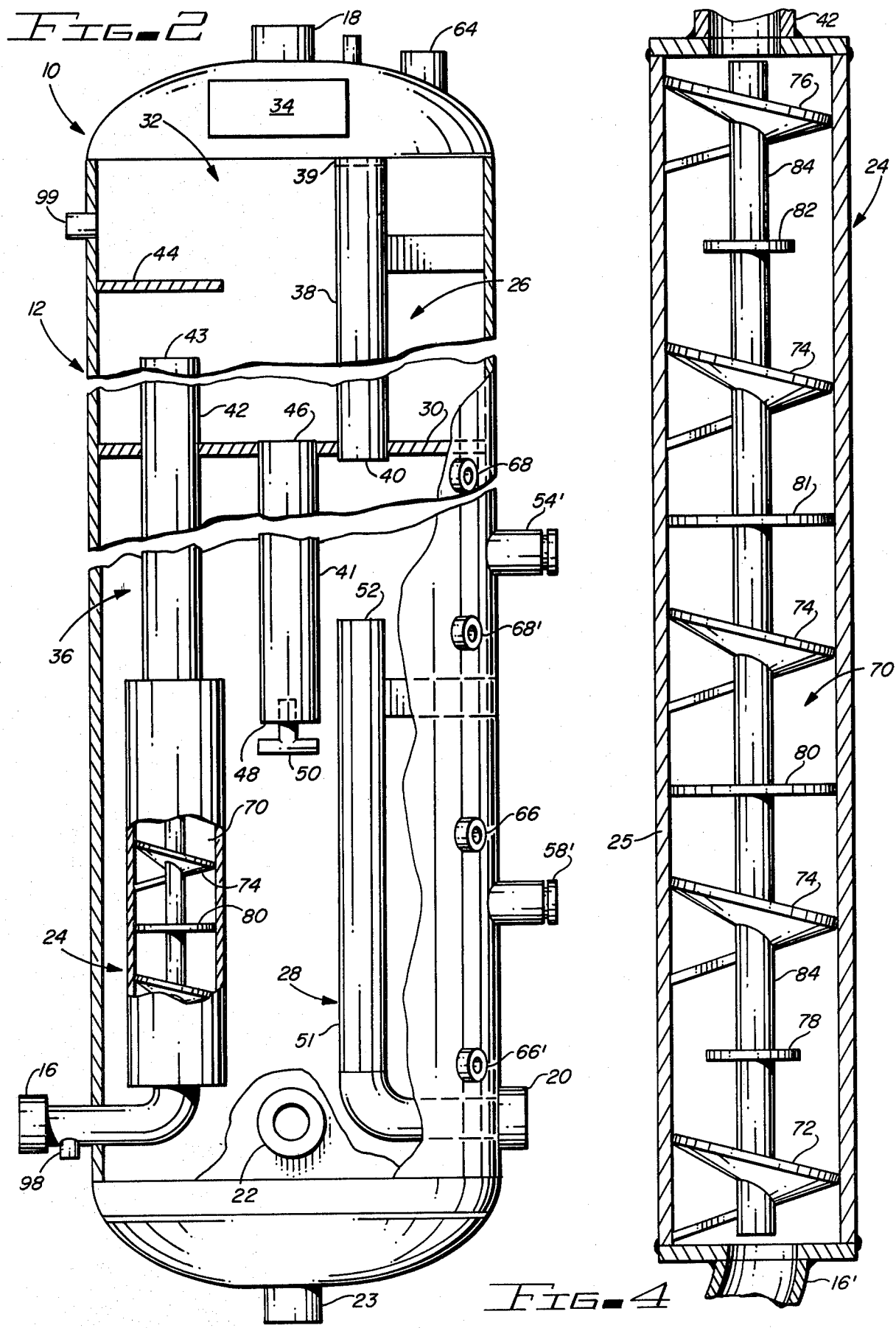

SEPARATOR AND METHOD FOR SEPARATION OF OIL, GAS AND WATER

BACKGROUND OF THE INVENTION

Most oil wells produce a substantial quantity of water along with the produced crude oil and gas. This mixture of gas, oil, and water becomes intimately mixed together as it flows from the hydrocarbon producing formation through the downhole casing perforations, into the tubing string, and uphole to the wellhead.

It is necessary to remove the gas from the mixture so that the gas can be sent to a gathering point or sales gas line. The oil and water must also be separated so that the valuable crude can likewise be flowed to a tank farm or to a pipeline.

Various prior art apparatus are known to those skilled in the art of hydrocarbon production by which a mixture of gas, oil, and water can be separated, as for example, a heater treater may be used wherein chemicals are admixed with the gas, oil, and water mixture so that the water is more readily released from the crude oil, and the separated oil and water is then flowed on to a suitable oil collection and to a water disposal apparatus.

It would be desirable to be able to separate a gas, oil, and water mixture without the employment of heater treaters and similar energy consuming, high maintenance apparatus. A separator which achieves this desirable goal is the subject of the present invention.

SUMMARY OF THE INVENTION

The present invention discloses method and apparatus for separating a mixture of gas, oil and water, one from the other, as the mixture is received from a hydrocarbon producing well, for example. The apparatus of the present invention comprehends a separator device for separating a mixture of oil, gas and water; which flows into an inlet thereof; into separated streams of oil, gas, and water, which flows from outlets thereof. The apparatus is in the form of a vessel having a bulkhead separating the interior thereof into a first separation chamber and a second separation chamber.

The inlet of the apparatus conducts the mixture of oil, gas and water through a dynamic separator which increases the droplet size of the oil and water contained within the mixture, thereby subsequently enhancing the separation of the three phases, one from the other.

The dynamic separator of the invention includes an inlet, an outlet, with the separator inlet being connected to the main inlet of the vessel so that the mixture can flow thereinto. The dynamic separator imparts a swirl effect into the flowing mixture, and then causes the mixture to flow along a parallel path through a baffle means, and then again swirls the mixture, and thereafter again flows the mixture along a parallel path through another baffle means, with this vortex type flow and linear type flow alternately occurring a plurality of times, with the droplet size of the oil-water mixture progressively increasing during the flow through the dynamic separator.

The mixture is then directed through an elongated barrel which forces a stream of the mixture into the first chamber. An impact plate member located within the chamber in spaced relationship to the end of the barrel is positioned so that the mixture flowing from the barrel impacts against the plate, where the mixture sprays out into the chamber as small droplets, thereby enabling most of the gaseous phase to separate from the mixture and flow towards a first gas chamber which forxsthe top of the vessel. At the same time, the oil and water, along with any residual gas, gravitates to the bottom of the first chamber and flows down through a stand pipe, into a second chamber, where the liquid phase covers approximately two thirds of the lower portion of the second chamber and where the liquid phase separates into a water and a crude oil phase; with there being a second gas chamber which forms the top of the second chamber.

The bulkhead forms the lower wall surface of the first chamber and the upper wall surface of the second chamber. A second stand pipe connects the second gas chamber to the first gas chamber so that the residual gas separating from the oil-water mixture flows into the second gas chamber, up the second stand pipe to the first gas chamber, through a mist extractor, and through a gas outlet located at the upper extremity of the vessel.

The water and oil phase are maintained separate and within a predetermined range of liquid levels so that as sufficient oil accumulates, it is drawn off through an oil outlet and sent to suitable storage. The water likewise is drawn off through a water outlet and sent to disposal.

In some instances, the chemical characteristics of the oil-water mixture makes it necessary to add treatment chemicals to the mixture prior to the mixture entering the dynamic separator. The dynamic separator advantageously utilizes the treatment chemicals in a new and unusual manner, partially due to the alternate swirling and axial flow therethrough, so that the mixture is more easily subsequently separated into its three components.

Accordingly, a primary object of the present invention is the provision of a new separator means by which gas, oil, and water from an oil well are separated, one from the other.

Another object of the present invention is the provision of a separator by which a mixture of gas, oil, and water is separated into each fraction thereof, without the necessity of employing heat.

A further object of this invention is to disclose and provide an improved separator device by which a mixture of gas, oil and water are separated, one from the other, by first causing the droplet size of the oil and water to substantially increase, and then dispersing the mixture within a separation chamber where most of the gas separates from the oil and water, and thereafter separating the oil and water along with the residual gas, and flowing each separated component away from the device.

A still further object of this invention is the provision of a method by which gas, oil, and water are separated, one from the other, by flowing the mixture in a spiral, and thereafter flowing the mixture linearly, and thereafter again flowing the mixture in a spiral, and thereafter again flowing the mixture linearly across part of the interior of a gas separation chamber where the mixture impacts against an impact member and is finely dispersed within the chamber where most of the gas separates from the mixture, and thereafter the mixture flows by gravity into another chamber where the residual gas is separated, combined with the other separated gas, while the oil and water are separated one from the other by gravity.

Another and still further object of this invention is the provision of a process and apparatus by which a mixture of gas, oil, and water received from a hydrocarbon producing borehole are admixed with a treatment chemical, and thereafter separated from one another by physically treating the mixture in a manner to achieve separation thereof in a new and unusual manner.

These and various other object and advantages of the invention will become readily apparent to those skilled in the art upon reading the following detailed description and claims and by referring to the accompanying drawings.

The above objects are attained in accordance with the present invention by the provision of a method for use with apparatus fabricated in a manner substantially as described in the above abstract and summary.

BRIEF DESCRIPTION OF THE DRAWINGS

FIG. 1 is a diagrammatical, cross-sectional view of a gas, oil and water separator device made in accordance with the present invention;

FIG. 2 is a longitudinal, part cross-sectional view of the gas, oil, and water separator disclosed in FIG. 1;

FIG. 3 is a top plan view of the apparatus disclosed in FIG. 2;

FIG. 4 is an enlarged, longitudinal, part cross-sectional view of part of the apparatus disclosed in FIG. 2; and;

FIGS. 5, 6, 7, and 8, respectively, are perspective views of parts of the foregoing apparatus.

DETAILED DESCRIPTION OF THE PREFERRED EMBODIMENTS

In FIG. 1, together with FIGS. 2 and 3 there is diagrammatically illustrated a system, or process, or a method for separating gas, oil, and water, one from the other. A separator in the form of a vessel 12 is connected to the wellhead 14 of a hydrocarbon producing well by means of mixed fluid inlet 16. The vessel includes a treated gas outlet 18 at the upper extremity thereof, a treated oil outlet 20 near the lower extremity thereof and a separated water outlet 22, more of less aligned with the oil outlet and the mixed fluid inlet. A drain 23 is located at the lowest elevation of the vessel, through which bottoms, sludge, and water can be expelled from time to time.

Within the vessel there is operatively supported a dynamic separator 24, made in accordance with the present invention. A first separation chamber 26 is formed within the interior of the upper marginal end of the vessel. Numeral 27 broadly indicates the lower portion of the first separation chamber where partially separated oil and water accumulates. Numeral 28 broadly indicates the second separation chamber where oil and water are separated, one from the other. A bulkhead 30 separates the upper or first chamber 26 from the lower or second chamber 28. The upper portion 32 of the first chamber is considered to be an upper or first gas chamber. A mist extractor 34 is located in supported relationship at the upper extremity of the first chamber, through which gas must flow in order to reach gas outlet 18. The mist extractor can take on several different forms, and the details thereof are known to those skilled in the art.

The upper part 36 of the second separation chamber is considered to constitute a second or lower gas chamber. The upper and lower gas chamber are interconnected by means of flow passageway 38; which is in the form of a stand pipe, and which is supported at inlet 40 by means of bulkhead 30. The outlet 39 of the gas passageway extends up into the upper gas chamber.

A stand pipe 41, through which separated oil and water can flow, is spaced from gas passageway 38 and barrel 42. The barrel has an inlet end connected to the dynamic separator 24. The barrel passes through and is partially supported by the bulkhead, and includes an outlet 43 spaced from a fluid impact means 44. The fluid impact means 44 preferably is a plate member which is supported in proximity of the lower end of the first gas chamber in spaced relationship respective to the outlet end of the barrel.

Numeral 46 indicates the inlet formed through the bulkhead and into the passageway 41. Numeral 48 indicates the outlet of passageway 41. Baffle plate 50 is supported by the free end of the passageway 41 in spaced relationship therewith.

A downcomer 51 is connected to the oil outlet 20 and freely terminates at inlet end 52 at a location which defines the lowermost limit of the range LO of the oil phase contained with the lower separation chamber. Oil level control 54, which can take on several different forms and usually is in the form of a float level actuated switch assembly, is connected to oil control valve 56 to thereby control or throttle the surface level of the oil phase within the range LO. Water level control 58 is of similar construction to the oil level control, and actuates or throttles a water disposal valve 60 in response to the water level working range LW.

Looking now in particular to the details of FIGS. 2 and 3, in conjunction with the other figures of the drawings, an instrument gas supply 62 and safety valve 64 are provided in the upper dome of the vessel (FIG. 3). Gauge cocks 66, 66' and 68, 68' (FIG. 2) provide for a sight glass which enables one to visually monitor the oil and water levels LO and LW. Most of the remaining details of FIGS. 2 and 3 have already been discussed in conjunction with FIG. 1.

In FIG. 4, numeral 70 broadly indicates the interior of the dynamic separator 24, which is in the form of a swirl producing chamber, and includes a lower spiral plate member 72 at the entrance thereof, several middle or centrally located spiral plate members 74, and an upper spiral plate member 76 located near the outlet thereof. The details of the spiral plate members are seen illustrated in FIG. 9. The spiral plate member is similar to a flight of an auger and imparts a swirl into fluid moving therethrough.

A small lower baffle 78 is interposed between the two lowermost spiral plate members. Two large baffle members, 80 and 81 are interposed between alternant ones of the spiral plate members. Another small baffle member 82 is interposed between spiral plate members 74 and 76. A central rod support member 84 extends along the longitudinal axial centerline of all of the spiral plate members, the baffle plate members, and is coaxially aligned with respect to the housing 25.

In FIG. 5, the baffle 81 is seen to include a plurality of circumferentially arranged crescent shaped slots 84 spaced from one another, and from the rod support. The baffle 81 slidably engages the inside peripheral wall surface of the housing 25.

In FIG. 6, the baffle plate 80 is seen to be provided with crescent slots 88 and 90 which are both circumferentially spaced apart from one another and radially spaced apart from one another. The baffle plate 80 is supported by the support rod 84 and has an outer peripheral wall which slidably engages the inner wall surface of the housing.

The construction of the spiral plates 72, 74, and 76 are illustrated in FIG. 9 and are seen to comprise a bent-up, circular piece of apertured plate metal having edge portions 94 and 96 separated form one another to thereby provide for pitch, much like the pitch of a screw, so that the mixed fluid flow thereacross is imparted with a spiral flow, sometime referred to as a vortex. This action imparts a spinning motion into the fluid. The spinning fluid next passes through one of the apertured baffle plates where linear or parallel flow is established, whereupon the fluid is again passed through another spiral plate, and so on, thereby increasing the droplet size of the liquid during the passage of the mixed flow through the dynamic separator.

In FIG. 1, treatment chemical at T is metered by pump P through the illustrated valve and into the inlet 16 of the vessel.

OPERATION

In operation, gas, oil, and water produced at wellhead 14 is received at inlet 16 of vessel 12. The mixed fluid flows through the dynamic separator and is alternately changed into a vortex, and then parallel or linear flow, and then again is spiraled, and again is changed back to parallel flow, with this alternate action occurring a plurality of times depending upon the number of alternate baffle plates and alternate spiral plates that are contained within the dynamic separator. The mixed flow continues through the barrel 42, where the droplet size of the oil and water has been increased, and consequently the mixed flow emerging at outlet 43 and impinging upon plate member 44 more readily releases the gaseous products therefrom as the mixed flow is dispersed as a fine spray throughout the central portion of the upper separation chamber. Gas therefore separates from the dispersed mixture and flows upwardly into the gas chamber 32, while the large oil and water droplets accumulate within the lower portion 27 of the upper separation chamber. The accumulated oil and water, together with any residual gas, flows down through piping 21 and emerges at outlet 48 where the flow cascades over the circular plate member 50.

The residual gas escapes from the cascading mixture and flows upwardly into the lower gas chamber 36, into inlet 40, up through the passageway 38, through outlet 39, and into the upper gas chamber. The accumulated gas within chamber 32 flows through the mist extractor, where any remaining liquid is removed therefrom, through the gas outlet 18, and to the sales gas line.

The oil and water which gravitated into the lower separation chamber is maintained fairly quisent so that the water phase separates and resides in the lowermost portion of the lower chamber and maintains a surface level LW, while the oil phase rises into the medial portion of the lower separation chamber, and maintains a surface level LO.

The levels, LO and LW, are maintained within the indicated range by the action of valves 56 and 60, which are throttled in a manner known to those skilled in the art, as previously pointed out herein.

Clean oil, free of gas and water, flows from valve 56 to the indicated storage. Water flows from valve 60 to the water disposal. From time to time, bottoms, sludge, and water can be drained from the bottom of the vessel by means of a valve attached at 23.

In some instances, in order to enhance the separation of the components of the mixture one from the other, it is advantageous to employ treatment chemicals at T by means of pump P so that a predetermined flow rate of the treatment chemical is injected into the water, oil, and gas mixture at inlet 16. The treatment chemical can take on any number of forms or composition and is marketed by various different oil field chemical companies such as Tret-O-Lite, and Champion, for example. The chemical enhances the separation of the components of the mixture, however, it is not always necessary to employ the treatment chemical, depending upon the characteristics of the crude oil.

One specific example of the size of the spiral plate members and baffle members for a four inch diameter dynamic separator 30 inches length, and positioned within a vessel 24 inches outside diameter and 10 feet in length is as follows:

Baffles 80 and 81; 4 inches outside diameter, $\frac{3}{8}$ inches wide crescent slots, separated by 30° lands, $\frac{1}{4}$ inches thick plate. Blades 74; 4 inches outside diameter, 2 inch pitch per 360°, 10 gauge metal. The support rod was $\frac{3}{4}$ inch outside diameter.

The barrel 42 was extended 18 inches beyond the baffle plate and was a 2 inch outside diameter pipe. Conduits 38, and 51 likewise were 2 inch outside diameter pipe. Conduit 41 was a 3 inch outside diameter pipe, 24 inches in length. The outlet 52 of the 2 inch pipe 51 was positioned 18 inches below the baffle plate and 6 inches above the outlet 48 of pipe 41.

The upper and lower chambers were completely separated by the baffle plate 30 with the only flow therethrough being the piping affixed thereto.

I claim:

1. A process for separating a mixture of oil, gas, and water comprising the steps of:
   (1) progressively increasing the droplet size of the oil and water of said mixture by flowing said mixture in a spiral, and thereafter flowing said mixture linearly into a first separator chamber;
   (2) separating gas from the mixture in said first separator chamber by impacting the last said linearly flowing mixture against an impact member, and flowing separated gas upwardly into an upper gas chamber while flowing the residual mixture downwardly through a passageway into an oil, water separation chamber;
   (3) forming a gas phase, oil phase, and water phase, respectively, at the upper, medial, and lower elevations, respectively, of said oil, water separation chamber;
   (4) connecting said gas phase to said upper gas chamber and flowing the separated gas away therefrom and to a point of gas collection;
   (5) flowing oil which accumulates at said oil phase away from said oil, water separation chamber and to a point of collection at a rate which maintains said oil phase; and,
   (6) flowing water away from said water phase and to a point of collection at a rate to maintain said water phase.

2. The process of claim 1 and further including the steps of forming said upper gas chamber in the upper part of said first separator chamber; and, forming said oil, water separation chamber in underlying relationship respective to said first separator chamber.

3. The process of claim 2 wherein the impacting of step (2) is carried out by flowing said last said linearly flowing mixture along the interior of an elongated tubular member and directing the flow from an outlet of said tubular member and across part of the length of said first separator chamber; and, directing the mixture from said impact member in a direction away from said upper gas chamber; and, accumulating liquid comprised of mostly oil and water in the lower part of said first separator chamber while separated gas flows into the upper part of said first separator chamber.

4. The process of claim 1 wherein the step of flowing said mixture in a spiral is achieved according to the steps of:

supporting several spiral-like laterally arranged plates in spaced relationship along the longitudinal axis and within a flow conduit;

supporting a laterally arranged perforated baffle plate between said spiral-like plates along the longitudinal axis and within said flow conduit;

whereby; said mixture is forced to flow in a vortex by the action of said spiral-like plates, and thereafter said mixture is forced to flow linearly by the action of said perforated baffle plate.

5. The process of claim 4 and further including the steps of forming said upper gas chamber in the upper part of said first separator; and forming said oil, water separation chamber in underlying relationship respective to said first separator.

6. The process of claim 5 wherein the impacting of step (2) is carried out by flowing said last said linearly flowing mixture along the interior of an elongated tubular member and directing the flow from an outlet of said tubular member and across part of the length of said first separator chamber; and, directing the mixture from said impact member in a direction away from said upper gas chamber; and, accumulating liquid comprised predominately of oil and water in the lower part of said first separator chamber while separated gas flows into the gas chamber located in the upper part of said first separator chamber.

7. The process of claim 1 wherein the step of flowing said mixture in a spiral is achieved according to the steps of:

supporting several spiral-like plates in laterally spaced relationship along the longitudinal axis and within a flow conduit;

supporting a perforated baffle plate laterally of said flow conduit and between said spiral-like plates to cause said mixture to flow in a vortex by the action of said spiral-like plates, and thereafter said mixture is forced to flow linearly by the action of said perforated baffle plate; forming said upper gas chamber in the upper part of said first separator chamber; and forming said oil, water separation chamber in underlying relationship respective to said first separator chamber;

carrying out the impacting of step (2) by flowing said last said linearly flowing mixture along the interior of an elongated tubular member and directing the flow from an outlet of said tubular member and across part of the length of said first separation chamber;

directing the mixture from said impact member in a direction away from said upper gas chamber; and, accumulating liquid comprised of mostly oil and water in the lower part of said first separator chamber while flowing separated gas into the gas chamber located in the upper part of said first separator chamber.

8. A separator device for separating a mixture of gas, oil, and water into separate streams of gas, oil, and water; said separator having a gas outlet, an oil outlet, and a water outlet; comprising:

a vessel, a bulkhead separating the interior of the vessel into a first separation chamber and a second separation chamber;

a dynamic separator for increasing the droplet size of oil and water contained within the mixture of gas, oil, and water by flowing said mixture in a spiral; said dynamic separator includes an inlet, an outlet, and means connecting said inlet to said mixture;

a barrel having an inlet connected to said outlet and an outlet opposed to said inlet, an impact member positioned within said first separation chamber in spaced relationship respective to said barrel outlet;

a first flow passageway means connected to conduct flow from the lowermost part of said first separation chamber to a location within said second separation chamber;

a second flow passageway means connected to conduct flow from the uppermost part of said second separation chamber to a location at the upper part of said first separation chamber;

a third flow passageway means connected to conduct flow from a location within said second separation chamber which is elevated respective to the outlet of the second flow passageway means, to said oil outlet;

and means connecting the water outlet to a lower part of the second separation chamber.

9. The device of claim 8 wherein said dynamic separator is an elongated housing having an inlet connected to the mixture inlet, and an outlet connected to the inlet of the barrel;

a plurality of spiral members spaced from one another and arranged laterally respective to the longitudinal axis of the housing for forming a vortex type flow; a perforated baffle between each said spiral member, each said perforated baffle is arranged laterally respective to the housing for imparting linear flow into the mixture flowing therethrough.

10. The device of claim 8 wherein the upper end of the first separation chamber forms an upper gas chamber; the upper end of said second separation chamber forms a second gas chamber; said second flow passageway means conducts flow of any gas which may separate in the second chamber to said upper gas chamber.

11. The device of claim 8 wherein means are provided by which the fluid level of any separated water is regulated to form a water phase having a level which is below the inlet of the third flow passageway;

and means are provided by which the separated oil level is regulated to form an oil phase having a level which is below the second gas chamber and above the lower end of the first flow passageway.

12. The device of claim 11 wherein the upper end of the first separation chamber forms an upper gas chamber; the upper end of said second separation chamber forms a second gas chamber; said second flow passageway conducts flow of any gas which may separate in the second chamber to said upper gas chamber.

13. The device of claim 12 wherein said dynamic separator includes a housing having an inlet connected to the mixture inlet, and an outlet connected to the inlet of the barrel;

a plurality of spiral members spaced from one another and arranged laterally respective to the longitudinal axis of the housing for forming a vortex type flow; a perforated baffle located between each said spiral member, said perforated baffle is arranged laterally respective to the housing for imparting linear flow into the mixture.

14. The device of claim 8 wherein said dynamic separator is a housing having an inlet connected to the mixture inlet, and an outlet connected to the inlet of the barrel;

a plurality of spiral members spaced from one another and arranged laterally respective to the longitudinal axis of the housing for forming a vortex; a perforated baffle between each said spiral member, said perforated baffle is arranged laterally respective to the housing for imparting linear flow into the mixture;

the upper end of the first separation chamber forms a gas chamber; the upper end of said second separation chamber forms a second gas chamber; said second flow passageaway conducts flow of any gas which may separate in the second chamber to said gas chamber.

15. The device of claim 14 wherein means are provided by which the separated water forms a level which is regulated to form a water phase having a level which is below the inlet of the third passageway;

and means are provided by which the separated oil level is regulated to form an oil phase having a level which is below the gas chamber and above the lower end of the first flow passageway.

* * * * *

UNITED STATES PATENT AND TRADEMARK OFFICE
CERTIFICATE OF CORRECTION

PATENT NO. : 4,424,068

DATED : January 3, 1984

INVENTOR(S) : JOHN F. McMILLAN

It is certified that error appears in the above-identified patent and that said Letters Patent is hereby corrected as shown below:

```
Column 1, line 39, substitute --flow-- for "flows";
          Line 49, after "inlet" first occurrence substitute
--and-- for ",";
Column 2, line 1, substitute --forms the-- for "forxsthe";
          Line 19, substitute --phases-- for "phase";
Column 3, line 39, substitute --or-- for "of";
          Line 64, substitute --chambers-- for "chamber";
Column 5, line 2, substitute --Figure 8-- for "Figure 9";
          Line 4, substitute --from-- for "form";
          Line 7, substitute --sometimes-- for "sometime";
          Line 21, substitute --are-- for "is";
          Line 25, substitute --alternant-- for "alternate";
          Line 36, delete "the" second occurrence;
          Line 51, substitute --are-- for "is";
```

UNITED STATES PATENT AND TRADEMARK OFFICE
CERTIFICATE OF CORRECTION

PATENT NO. : 4,424,068
DATED : January 3, 1984
INVENTOR(S) : JOHN F. McMILLAN

It is certified that error appears in the above-identified patent and that said Letters Patent is hereby corrected as shown below:

Column 8, line 12, insert --receive a flow of-- after "to".

Signed and Sealed this

Thirty-first Day of August, 1993

*Attest:*

BRUCE LEHMAN

*Attesting Officer*     *Commissioner of Patents and Trademarks*